(12) United States Patent
Bay

(10) Patent No.: US 9,994,703 B2
(45) Date of Patent: Jun. 12, 2018

(54) BIO COMPOSITE ABS/CF MATERIAL

(71) Applicant: Mohammad Ali Bay, Tehran (IR)

(72) Inventor: Mohammad Ali Bay, Tehran (IR)

( * ) Notice: Subject to any disclaimer, the term of this patent is extended or adjusted under 35 U.S.C. 154(b) by 0 days. days.

(21) Appl. No.: 15/219,310

(22) Filed: Jul. 26, 2016

(65) Prior Publication Data

US 2018/0030261 A1  Feb. 1, 2018

(51) Int. Cl.
*C08L 47/00* (2006.01)
*C08L 1/02* (2006.01)

(52) U.S. Cl.
CPC .................. *C08L 47/00* (2013.01); *C08L 1/02* (2013.01)

(58) Field of Classification Search
CPC ............. C08L 1/02; C08L 97/02; C08L 55/02
See application file for complete search history.

(56) References Cited

U.S. PATENT DOCUMENTS

| | | | | |
|---|---|---|---|---|
| 4,597,928 A * | 7/1986 | Terentiev | ................ | C08L 97/02 162/145 |
| 6,270,883 B1 * | 8/2001 | Sears | ........................ | B29B 7/92 428/292.1 |
| 2004/0142160 A1 * | 7/2004 | Cannon | .................. | B27N 3/002 428/304.4 |
| 2005/0011621 A1 * | 1/2005 | Westermark | .............. | D21J 3/00 162/9 |
| 2006/0289132 A1 * | 12/2006 | Heijnesson-Hulten | . | C08B 15/02 162/70 |
| 2007/0125507 A1 * | 6/2007 | Walter | ..................... | D21B 1/16 162/24 |
| 2010/0193116 A1 * | 8/2010 | Gamstedt | ............... | D21H 13/12 156/246 |

* cited by examiner

*Primary Examiner* — Liam J Heincer
(74) *Attorney, Agent, or Firm* — Azadeh Saidi

(57) ABSTRACT

The bio composite (ABS/CF) material combined with the percentage of cellulose polymer compounds and chemical plant was built with nano-sized minerals. Cellulose compounds by chemical solution on specific treatments have been performed. Bio-composite material made of cellulose bio polymer composites, nano-sized minerals and compounds with a coupling agent was made.

6 Claims, 2 Drawing Sheets

Test Composite
Heat Resistance
ABS / CF at a
temperature of 180
° C /24 h

2b

Test Composite
Heat Resistance
ABS / CF at a
temperature of 200
° C /24 h

3b

Test Composite
Heat Resistance
ABS /CF at a
temperature of 250 °
C/24 h

4b

BIO COMPOSITE ABS/CF MATERIAL

BACKGROUND OF THE INVENTION

As a result of the growing environmental awareness (e.g., increased pollution, increasing demand for biodegradable materials, material need for CO2 neutrality and low greenhouse gas emissions, new environmental laws and regulations), manufacturers and scientists are keen to study novel environmental friendly materials. Over the last decade intensive research and development has been carried out in order to develop powerful composites using natural fibers, offering good biodegradability and sustainability.

A biodegradable material will slowly undergo biodegradation by surrounding microorganisms, bacteria, and exposure to the elements and hence could provide solutions to end-of-life issues after service life. Nowadays, the fibers resulting from wood, animals, leaves, grasses and other natural sources are commonly used as reinforcement in composites used for various applications, like automotive (interior and exterior), building, ship, packaging etc., due to their unusual properties compared to other synthetic fibers.

Advances in manufacturing techniques in natural fiber-reinforced composites have allowed the car industry to utilize these composites in interior trimmings. Besides the environmental benefits, compared to glass fiber composites, the natural fiber reinforced composites with the equivalent performances have higher fiber content, resulting in less pollution from synthetic polymer matrix, and much lighter weight, reducing the amount of driving fuel in automotive applications.

SUMMARY OF THE INVENTION

Figure 1A:
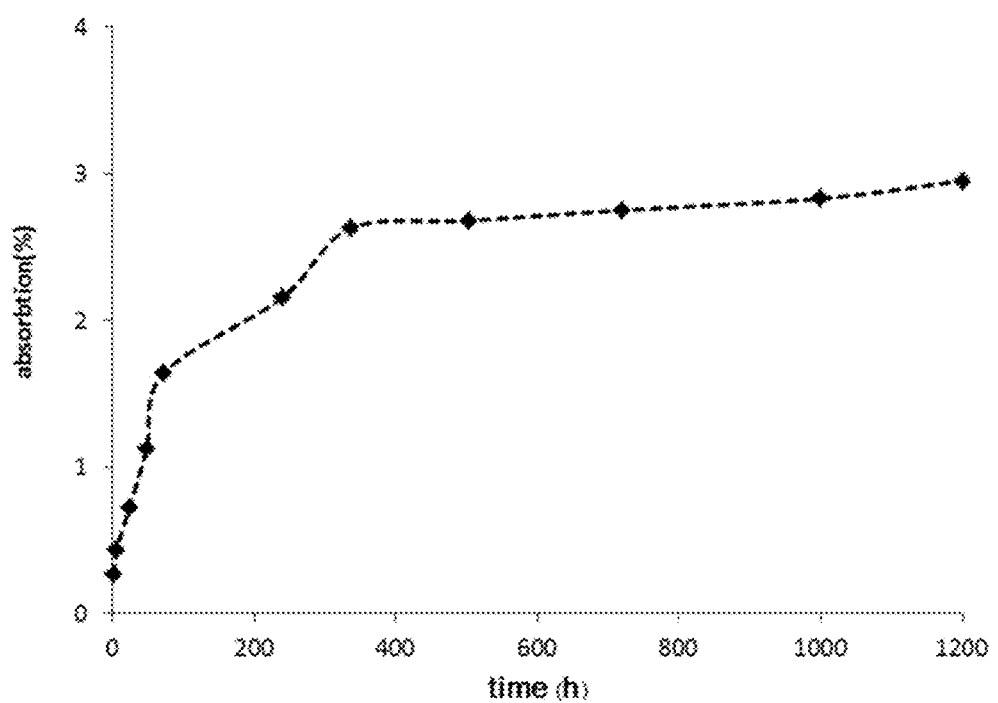
FIG. 1A, displays Bio-Composite moisture absorption test with 1200 hours of immersion in water.
Figure 2B:
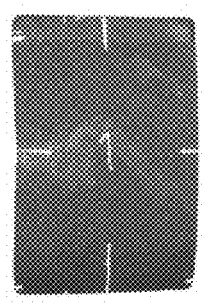
FIGS. 2B, 3B and 4B display a heat resistance test on the Bio-composites generated, in the range of 180 to 250° C.

Current environmental concerns and stricter regulations throughout the world have led to a wide shift towards the design of engineering materials using ecologically—friendly and sustainable manufacturing methodologies. In this context, the use of renewable materials such as natural fibers in commodity composites has rapidly increased over the past few years and more recently natural fibers have become one of the fastest growing filler and reinforcing materials for thermoplastics.

Bio-composites which are derived from the combination of natural fibers with a thermoplastic (or a thermoset) have been used for a number of applications in the automotive, building and packaging sectors.

Bio-composite is a composite material formed by a matrix (resin) and a reinforcement of natural fibers. These kinds of materials often mimic the structure of the living materials involved in the process keeping the strengthening properties of the matrix that was used, but always providing biocompatibility. The matrix phase is formed by polymers derived from renewable and nonrenewable resources. The matrix is important to protect the fibers from environmental degradation and mechanical damage, to hold the fibers together and to transfer the loads on it. In addition, bio fibers are the principal components of bio composites, which are derived from biological origins, for example fibers from crops (cotton, flax or hemp), recycled wood, waste paper, crop processing byproducts or regenerated cellulose fiber (viscose/rayon).

The interest in bio-composites is rapidly growing in terms of their industrial applications (automobiles, railway coach, aerospace, military applications, construction, and packaging) and fundamental research, due to its great benefits (renewable, cheap, recyclable, and biodegradable). The differential for this class of composites is that they are biodegradable and pollute the environment less, which is a concern for many scientists and engineers to minimize the environmental impact of the production of a composite. They are a renewable source, cheap, and in certain cases completely recyclable.

One advantage of natural fibers is their low density, which results in a higher tensile strength and stiffness than glass fibers, besides of its lower manufacturing costs. As such, bio-composites could be a viable ecological alternative to carbon, glass and man-made fiber composites. Natural fibers have a hollow structure, which gives insulation against noise and heat. It is a class of materials that can be easily processed, and thus, they are suited to a wide range of applications, such as packaging, building (roof structure, bridge, window, door, green kitchen), automobiles, aerospace, military applications, electronics, consumer products and medical industry (prosthetic, bone plate, orthodontic archwire, total hip replacement, and composite screws and pins).

Composite materials may be restricted to emphasize those materials that contain a continuous matrix constituent that binds together and provides form to an array of a stronger, stiffer reinforcement constituent. The resulting composite material has a balance of structural properties that is superior to either constituent material alone. Combining the advantages of inorganic and organic components; composites that show good biocompatibility and favorable bonding ability with surrounding, host tissues inherent from abs/cf.

In making this composite to dispel some of the flaws in the manufacturing of bio-composites has been a lot of attention. Bio-composites are highly hydrophilic nature of the use of natural fibers; the matrix of the composite material using a special type of water absorption of the bio-composite is greatly reduced. For antibacterial properties of the composite materials with antibacterial mineral base, the bio-matrix composite material is placed so that the property has a high durability. The use of materials resistant to heat and flame, the silicon oxide based nanomaterials and the mineral perlite is provided.

Fulvic acid as chemical treatments on cellulose fibers to create better connections in bio-matrix composites is used. Carbon was activated to improve impact resistance, high impact resistance of the parts were used.

Bio Composite ABCS/CF with the amount of pearlite with size (60 microns) has much reduced water absorption and thickness swelling. The impact of the increased use of perlite, which makes use of components that are resistant to impact, flexural and tensile strength, flexural modulus and tensile strength of the bio composite is very high compared to the same bio-composite materials is very important. The bio-composite alternative to wood products, such as MDF-HPL-LVL-FLAKEBORD-WEFERBOARD, plastic parts, as well as an alternative to PVC, ABS and PP is the base polymer. You can also use the halogen and flame retardant materials and other additives, the use of bio-composite increased.

Bio-composites containing carbon with high elastic and highly resistant to impact a broad range of applications in the automotive industry and determine which factors are sensitive to impact.

Bio-composite particles contain monomers and polymers prepared from herbal insect flight. Bio Composite moisture absorption test with 1200 hours of immersion in water and passed with a minimum amount of water absorption is visible in FIG. 1A.

Figure 3B:
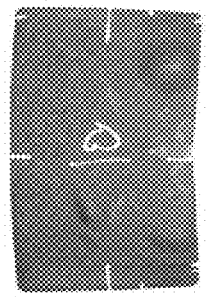
Figure 4B:
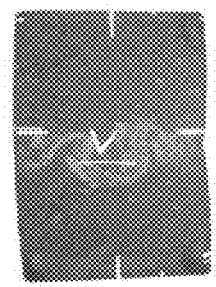
Figure 5:
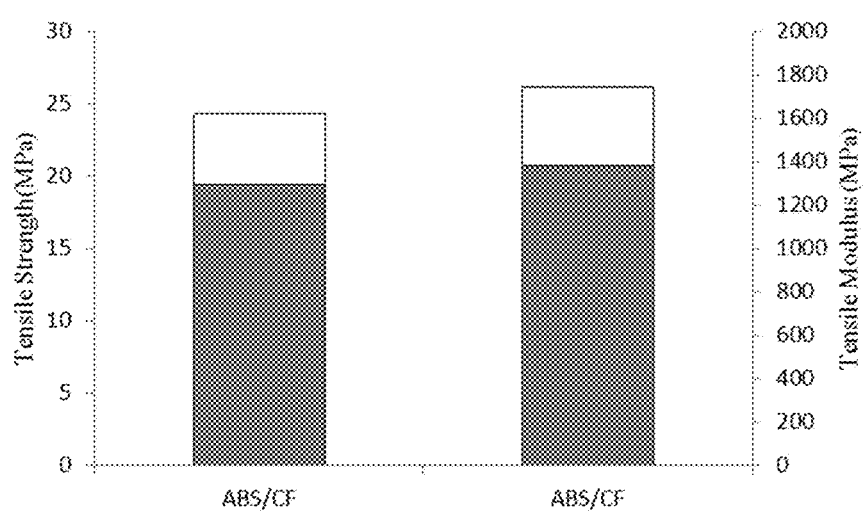
FIG. 5 displays test of flexural modulus of elasticity.

As displayed in FIG. 3 a combination of herbal and bio-polymer specific compounds are among the main advantages of bio-composites.

Test of resistance to chemicals and detergents (in the span of 7 days of immersion in strong and weak acids and alkaline solutions) was successfully performed on the current bio-composite.

This bio composite can replace body parts, such as computers and computer monitors and keyboards and printers, as well as plastic parts for use in automobiles, recycle them and return them to the cycle industry.

The bio-composite features:
1. In terms of technique and composition of the material is differentiated from other composites.
2. The type of material used in bio-composite structure and the characteristics of the bio-composite materials are distributed uniformly in the matrix and are located.
3. Antibacterial capability and high heat resistance and high resistance to chemical substances and solutions.
4. Escape the application of insecticides and fungicides in plant-based polymer structure.

Description:
Characteristics of Composite Materials

The rudimentary characteristics of composite materials are:
High fatigue scathe tolerance and high fatigue strength, in addition to high specific strength and modulus,
Tailor able or designable materials for microstructure,
Creation and production of both structure and material or component in a single operation manufacturing flexible, complex geometry and net-shape,
Durable and Corrosion resistance,
Anisotropic,
Other unique functional properties—damping, low CTE (coefficient of thermal expansion).

Advantages of Composite Materials

There are many advantages of composites, together with lighter weight, improved fatigue life, the ability to tailor the layup for optimum strength and stiffness, resistance to corrosion, and with beneficial in design practice, assembly costs is reduce due to less fasteners and detail parts.

The specific modulus (density) and certain strength of great strength carbon fibers are advanced than those of other comparable or equivalent aero-space metallic alloys. This converts into better weight savings ensuing in improved performance, fuel savings, longer range and greater payloads.

The many other advantages of composites are following:
High temperatures and weathering resistance,
High chemical stability,
High durability due to long prepare storage life,
Low smoke density, low flammability, and low toxicity of decomposition products,
Temperature resistance of course depends on choice of resin,
Huge selection of possible component size and shape,
Biopolymers derived from renewable resources are attracting the attention of scientists to replace traditional petro-based plastics in designing more eco-friendly bio-composites. Polylactic acid (PLA) is a highly versatile biodegradable polymer and is recently highlighted because it is derived from renewable resource. The use of such PLA as a cost-effective alternative to commodity petro-based plastic will increase the demand for agricultural products. Creating biodegradable products from waste materials is one way to make products environmentally friendly. Another way is to make products from sustainable resources. Cellulose from trees and plants is taken as a substitute for petroleum feedstock to make cellulosic plastic.

The development of 'green' composite materials that can be (economically) competitive replacements for Glass Fiber Reinforced Polymer (GFRP) composites is an important area of research. For a 'green' composite to be classed as a sustainable alternative, the manufacture, use and disposal phases need to be considered. (The issue is made more complicated by the current flexibility in the definitions of both 'green' and 'sustainable' in this context). Natural fiber (NF) composites utilize a range of fibers that occur in nature to produce systems that are perceived as 'green'. Here, the focus is on bio derived organic fibers, but since there is a range of growing techniques, fiber isolation methods and other treatment processes available, NFs for composites might not be deemed a sustainable option once these economic, energy and environmental costs are taken into account.

Natural/Bio-fiber composites (Bio-Composites) are emerging as a viable alternative to glass fiber reinforced composites especially in automotive applications. Natural fibers, which traditionally were used, as fillers for thermosets, are now becoming one of the fastest growing performance additives for thermoplastics. Advantages of natural fibers over man-made glass fiber are: low cost, low density, competitive specific mechanical properties, reduced energy consumption, carbon dioxide sequestration, and biodegradability. Natural fibers offer a possibility to developing countries to use their own natural resources in their composite processing industries.

The combination of bio-fibers like Kenaf, Hemp, Flax, Jute, Henequen, Pineapple leaf fiber and Sisal with polymer matrices from both non-renewable and renewable resources to produce composite materials that are competitive with synthetic composites requires special attention i.e. bio fiber-matrix interface and novel processing. Natural fiber reinforced composites have attained commercial attraction in automotive industries. Needle punching techniques as well as extrusion followed by injection molding for natural fiber thermoplastic composites as presently adopted in the industry need a "greener" technology—powder impregnation technology.

In the United States, 10 million to 11 million vehicles putter out each year and reach the end of their useful lives. A network of salvage and shredder facilities process about 96 percent of these old cars, about 25 percent of the vehicles by weight, include plastics, fibers, foams, glass and rubber remain as waste. A car made mostly of heated, treated and molded bio-fiber would simply bury at its lifetime, which would be consumed naturally by bacteria.

Composite as an industrial material, are mostly used for their outstanding resistance to chemicals and most forms of corrosion. This feature, even though conventionally important, is hardly the only useful feature. There are many other important and useful aspects are:
Low cost and low mass,
Unequalled manufacturing and processing possibilities,
Complex material body are easily produced, Tooling cost is very low,
Appropriate to very small products and very large product,
Satisfactory surface finish can be an integral feature.

Method:

The bio-composite (ABS/CF) material of this invention was combined with a percentage of cellulose polymer compounds and chemical plant and was built with nano-sized minerals. Cellulose compounds by chemical solution on specific treatments have been performed. Bio-composite material made of cellulose bio polymer composites, nano-sized minerals and compounds with a coupling agent was made. Biopolymer derived from plant material (wood flour mixed hardwoods and softwoods—bran rice—rice—industrial waste cellulose) that the particle size is in the range of 40 to 80 mesh.

The other polymeric compounds include bio-composite material made of poly lactic acid (PLA) and Acrylonitrile butadiene styrene polymer (ABS) Virgin and recycle the amount of in the range 20 to 80% of body parts laptop—Computers Body—Body Monitor—Body Cell Phones—recycled automobile parts. Amount of substance Coupling agent (MSA) (in the range of 0 to 8%), fulvic acid (in the range 0 to 6%), Perlite Mineral containing silicon oxide 60 microns in size) in the range 2 to 6%, rice husk ash (2%) and activated carbon which is about 2%, Essence of insect flight from tobacco plants built. Anti-bacterial Color film made with copper sulfate and iron and copper metal silicate mineral compounds (synthetic Color).

The first stage of the production of bio-composite prepared from a mixture of cellulose fibers (wood flour mixed hardwoods and softwoods—bran rice—rice—industrial waste cellulose). The fibers in sizes 40 to 80 mesh and the virgin fibers and waste are produced. The cellulose fibers are obtained by splitting the range of mesh sizes of 40 to 80 mesh (obtained by a Shaker). Next, the fibers were dried at 100° C. for 24 hours. The dried fibers were chemically treated into fulvic acid solution for 24 hours.

Poly lactic acid produced by the plant structure was combined with cellulose fibers. Acrylonitrile butadiene styrene polymer in the form of virgin and waste was used. Polymers of Virgin Samsung was prepared and parts from laptops, Computers, Monitors, Cell Phones, automobile parts was recycled and used.

The composition of the prepared fibers and poly lactic acid polymer ABS, coupling MSA, perlite containing nano silicon dioxide, rice husk ash, activated carbon, organic insect flight, and the granules were mixed by a machine, in order to prepare granules used to feed an injection machine.

The next step is a bio-composite coating color film made of antibacterial compounds sensitive to temperature and moisture conditions. Bio composites in the form of standard with an antibacterial color (copper sulfate) were generated. In addition, anti-fungal and anti-bacterial properties (due to the metal used) in different conditions of humidity and temperature in yellow, orange, red, green, blue and black on white was achieved. The bio-polymer film color by combining mineral plant was built. Therefore resistance to environmental conditions significantly raises the bio-composite.

Bio Composite ABS/CF of the most important applications in the automotive and electronics and the industries Polymer. The properties were tested Bio Composite than parts made from petroleum-based polymers (deformation lower thermal resistance at 150 to 250° C., and properties of bio-composite materials made from recycled materials much similarity with net there). The bio-composite can be a viable alternative to the automobile industry and its range of applications in the automotive and electronics industries. Also in the construction industry in the field of construction to replace the parquet flooring and wall covering and heavy car body construction and building fences, Pier and beam construction and electric signs and traffic as roof tile flooring and other applications other more. Here it is worth mentioning the problems of electronics and computer recycling computer parts such as body monitors and keyboards and printers, all of which are made by polymer, Failure to recycle them and return them to the production cycle of the industry Composite ABS/CF can be found at the end of the life cycle of the electronics industry to bring them back. The Composite built in automotive applications is essential.

The invention claimed is:

1. A method for making a Bio-composite ABS (acrylonitrile-butadiene-styrene polymer) and CF (cellulose fibers), comprising the steps of:
    a) Obtaining a mixture of cellulose fibers by separating said cellulose fibers through stacks/vertically mounted multiple sieves of a mechanical sieve shaker with mesh sizes progressing from 40 to 80 mesh;
    b) drying said mixture of cellulose fibers at 100° C. for 24 hours;
    c) treating said dried fibers in a fulvic acid solution;
    d) combining said dried cellulose fibers treated with fulvic acid with an acrylonitrile-butadiene-styrene polymer.

2. The method of claim 1, wherein said dried fibers are treated in said acid solution for 24 hours, wherein said dried fibers absorb and react with said fulvic acid in said solution within said time.

3. The method of claim 2, wherein said mixture of cellulose fibers comprises wood flour comprising a mixture of hardwoods and softwoods, bran rice, rice and industrial waste cellulose.

4. The method of claim 3, wherein said fibers in said mixture of cellulose fibers comprise particle size in a range of 40 to 80 mesh.

5. The method of claim 4, wherein said bio-composite is then mixed by a mixing machine with at least one of polylactic acid produced from a plant structure, acrylonitrile-butadiene-styrene (ABS) in the form of virgin or waste material, a coupling agent which is styrene-maleic anhydride, a perlite mineral containing silicon dioxide, rice husk ash, and/or activated carbon; and the bio-composite is then formed into granules for feeding into an injection machine.

6. The method of claim 5, comprising generating a color film of said bio-composite, said bio-composite further comprising an antifungal and antibacterial colorant sensitive to different temperatures and humidity conditions.

* * * * *